United States Patent
Dedick

(10) Patent No.: US 10,378,724 B2
(45) Date of Patent: Aug. 13, 2019

(54) REDUCED GLARE LED LIGHT DEVICE

(71) Applicant: Cory D Dedick, Wheaton, IL (US)

(72) Inventor: Cory D Dedick, Wheaton, IL (US)

(73) Assignee: Oculus-Shift, LLC, Carol Stream, IL (US)

( * ) Notice: Subject to any disclaimer, the term of this patent is extended or adjusted under 35 U.S.C. 154(b) by 0 days.

(21) Appl. No.: 15/986,260

(22) Filed: May 22, 2018

(65) Prior Publication Data

US 2018/0266652 A1 Sep. 20, 2018

Related U.S. Application Data

(63) Continuation of application No. 15/143,710, filed on May 2, 2016, now Pat. No. 9,989,212.

(60) Provisional application No. 62/155,277, filed on Apr. 30, 2015.

(51) Int. Cl.

| F21V 1/00 | (2006.01) |
|---|---|
| F21V 3/12 | (2018.01) |
| F21V 5/00 | (2018.01) |
| F21V 3/06 | (2018.01) |
| F21V 8/00 | (2006.01) |
| F21V 13/12 | (2006.01) |
| F21V 7/05 | (2006.01) |
| F21V 3/04 | (2018.01) |
| F21Y 105/16 | (2016.01) |
| F21Y 115/10 | (2016.01) |
| F21K 9/66 | (2016.01) |
| F21K 9/69 | (2016.01) |

(52) U.S. Cl.
CPC ............. *F21V 3/12* (2018.02); *F21V 3/0625* (2018.02); *F21V 5/007* (2013.01); *F21V 13/12* (2013.01); *G02B 6/0035* (2013.01); *F21K 9/66* (2016.08); *F21K 9/69* (2016.08); *F21V 3/049* (2013.01); *F21V 7/05* (2013.01); *F21Y 2105/16* (2016.08); *F21Y 2115/10* (2016.08)

(58) Field of Classification Search
CPC ..... F21K 9/66; F21K 9/69; F21V 3/12; F21V 3/049; F21V 3/062; F21V 5/007; F21V 7/05; F21V 13/12; F21Y 2105/16; F21Y 2115/10
USPC ....................................................... 362/244
See application file for complete search history.

(56) References Cited

U.S. PATENT DOCUMENTS

| 8,545,049 B2 * | 10/2013 | Davis ................ B29C 45/14467 362/244 |
| 8,783,898 B2 * | 7/2014 | Coleman ................... F21S 8/04 362/223 |
| 9,989,212 B2 * | 6/2018 | Dedick ................. F21V 3/0625 |

* cited by examiner

*Primary Examiner* — Ali Alavi
(74) *Attorney, Agent, or Firm* — Richards Patent Law P.C.

(57) ABSTRACT

A device for providing light including: a housing; an array of a plurality of LED lights mounted to the housing, wherein, when active, each LED emits a highest intensity beam of light along a primary axis and emits a lower intensity beam of light along a secondary axis; a lens mounted to the housing, the lens including an optic element corresponding to each of the plurality of LED lights, each optic element intersected by the primary axis of the corresponding LED light; and a translucent edge-light diffusing layer located between two or more of the plurality of LED lights, the edge diffusing layer is not intersected by the primary axis and is intersected by the secondary axis of the LED lights.

19 Claims, 2 Drawing Sheets

REDUCED GLARE LED LIGHT DEVICE

CROSS-REFERENCE TO RELATED APPLICATIONS

This application is a continuation of U.S. patent application Ser. No. 15/143,710 (U.S. Pat. No. 9,989,212), filed on May 2, 2016, which incorporates by reference and claims the benefit of priority to U.S. Provisional Patent Application No. 62/155,277, filed Apr. 30, 2015.

BACKGROUND OF THE INVENTION

The present subject matter relates generally to a device that provides light with reduced glare using light emitting diodes. More specifically, the present invention relates to an LED light source that filters and spreads light from the LEDs using various optical components before emitting the light in a target direction.

As LED technology has advanced and the diodes have gotten brighter there has been an increasing glare issue due to the intensity of the light source. This glare is increasingly a safety hazard for motorists driving at night.

Previous LED light systems have tried using angular refraction to reduce glare, while others have tried to use more conventional means of putting the LED diodes into a reflector housing and not using individual optical arrays. Other previous approaches include utilizing more diodes over a given array, which is a common, though more expensive, way to gain a softer light spread. Further, some previous lighting specifications are calling for a 4000° kelvin or lower light color instead of 5000° kelvin or above to soften glare.

Previous light systems using angular refraction rely on the use of total internal reflection (TIR) lenses. Those lenses are constructed on an individual cone refractor basis, which individualizes the optic for each diode. While seemingly effective, this approach lacks the ability to provide a seamless and transitional light source. The resulting array becomes spotty and often incorporates the use of a more complex plate system with openings for each optic. This extensively complicates the assembly process with many parts that are more expensive and labor intensive while still not pleasing to the eye in its final result.

Some previous systems have utilized pulling the diodes up into a conventional reflector system while partially hiding the actual light source from meeting the eye. The approach can be somewhat effective in solving the glare issue, but there is a definite loss of light due to bouncing it off of a reflective surface and there is a loss of beam control as well. This approach also makes for a more bulky fixture and can be a poor utilization of leveraging the flexible strengths of implementation LED technology. Using a lower kelvin count can help to curb the glare effect to some degree, although dropping below 4500° takes the LED outside of its optimal efficacy range and delivers very minimal results in curbing glare.

Accordingly, there is a need for reduced glare LED light device, as described herein.

BRIEF SUMMARY OF THE INVENTION

To meet the needs described above and others, the present disclosure provides a reduced glare LED light device that includes a larger surface area for the LED lights to disperse their energy.

By providing a LED light device that includes a larger surface area for the LED lights to disperse their energy, the LED light device overcomes the problems of prior approaches, such as angular refraction. By spreading out the individual intensity in a controlled manner the LED light device maintains control of the light patterns and significantly decreases the glare emitted by the individual diode.

In one example, the LED light device includes a layer of LED lights. The LED lights are arrayed on a circuit board. A layer of highly reflective Mylar film is placed over the circuit board, with the LED lights protruding through the Mylar film. Next, layered above the Mylar and sitting at approximately the same level as the LED lights is a thin white plastic made for edge lighting elements. The thin white plastic includes a series of precise openings machined for each of the LED diodes to show through. On top of the thin white plastic is mounted a conventional lens with molded-in optics for each individual diode. The lens is covered with a clear coating with a small refractory particles suspended within the coating.

It is contemplated that in an embodiment, the lens, white plastic, and Mylar film may be manufactured and sold as a single piece for later inclusion in an LED array. For example, a convention dual stage injection molding process may be utilized to manufacture the lens along with the edge lit plastics as a single unit. Plastic plating may be used to bond the reflective surface directly to the bottom of the lens. That lens may then go through a finishing process for the final application of light refractor particle clear coat. An advantage of manufacturing as a one-piece unit is to simplify the assembly process and reducing that cost factor.

As noted, a coating is applied to the outer surface of the lens that contains light refractory particles to help break up any remaining direct beams that could cause a flash of glare to be perceived by the eye. In an embodiment, this process utilizes a more controllable lens type that is comprised of many, molded optics onto a single lens plate. These optics may appear like a bubble on a flat plate that are aligned precisely with each of its corresponding diode. These lenses may be made in several different shapes that correlate to a desired light pattern for different uses. In some embodiments, the manufacturing process may utilize 3D printing technology to inject different substrates into the actual optic to target and break up the glare.

In an embodiment, a device for providing light includes: a housing; an array of a plurality of LED lights mounted to the housing, wherein, when active, each of the plurality of LED lights emits a highest intensity beam of light along a primary axis and emits a lower intensity beam of light along a secondary axis; a lens mounted to the housing, the lens including an optic element corresponding to each of the plurality of LED lights, each optic element intersected by the primary axis of a corresponding LED light of the plurality of LED lights; and a translucent edge-light diffusing layer located between two or more of the plurality of LED lights, the edge-light diffusing layer is not intersected by the primary axis and is intersected by the secondary axis of the two or more of the plurality of LED lights.

In an embodiment, each optic element includes a diffusive surface. And, in an embodiment, each diffusive surface includes a coating including suspended diffusive particles. Also, in an embodiment, the edge-light diffusing layer is translucent plastic. In an embodiment, the device further includes a reflective layer between the housing and the edge-light diffusing layer. In an embodiment, the primary axis of each LED light of the plurality of LED lights is parallel to the others.

In an embodiment, a thickness of the edge-light diffusing layer equals a thickness of the plurality of LED lights. And, in an embodiment, the edge-light diffusing layer extends above the light emitting-surface of the LED lights along the direction of the primary axis.

An object of the invention is to provide a solution to the glare problem of LED light arrays that has delayed the use of LED lights by towns and cities for roadway and area lighting applications. By simply solving an issue with the technology we will be able to open the doors to a bigger market segment that has been carefully watching and waiting for the tech improvements to happen.

An advantage of the invention is that it provides significant reduction in glare for LED lighting while maintaining full optical control of the light. This approach is departs from previous optical systems that are designed for maximum output of light.

Another advantage of the invention is that it provides improved safety from lighting. By reducing the glare factor with LED street lights, drivers will be able to not only see better on the roadway, they wont be plagued by temporary night blindness due to glare flash in their eyes.

A further advantage of the invention is that it provides an LED in which the overall effect of blending the light will be a reduction in the spotty look of individual diodes and allows for a much more pleasing and unified look from the light source.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
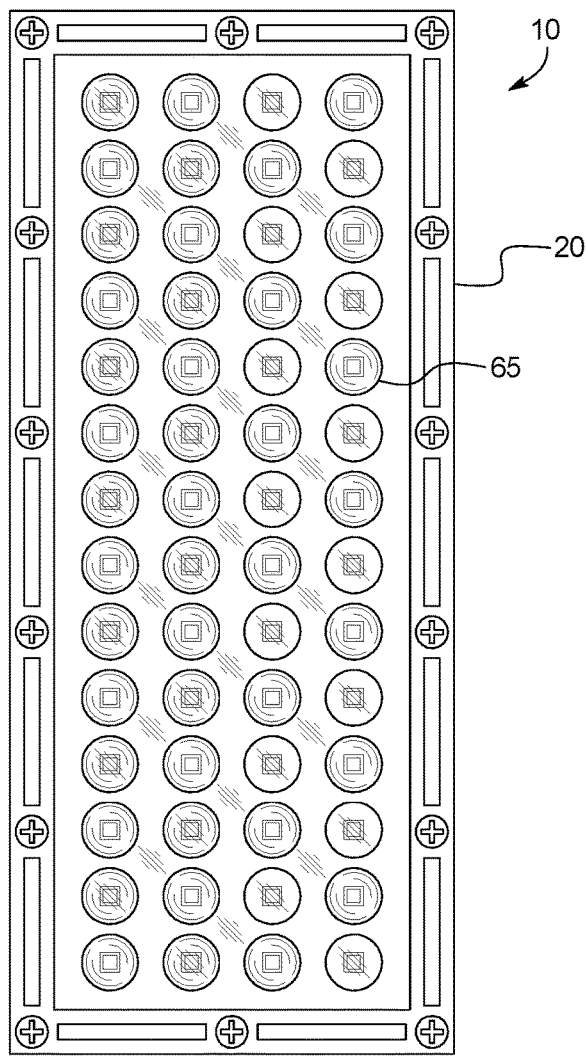
FIG. 1 is a front view of an example light device.

FIG. 1 illustrates an example of a light device 10. As shown in FIG. 1, the light device 10 may be embodied as a planar light source including an array of LED lights. The light device 10 may be adapted to provide light from nearly its entire surface area by spreading out the light from LED lights embedded within. The dispersal of the light energy minimizes angular refraction and significantly decreases the glare emitted by each individual diode in the light device 10.

Figure 2:
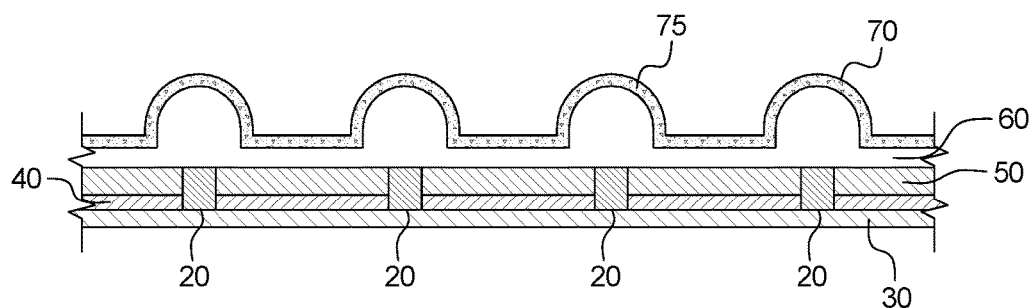
FIG. 2 illustrates a cross section of the light device of FIG. 1.
Figure 3:
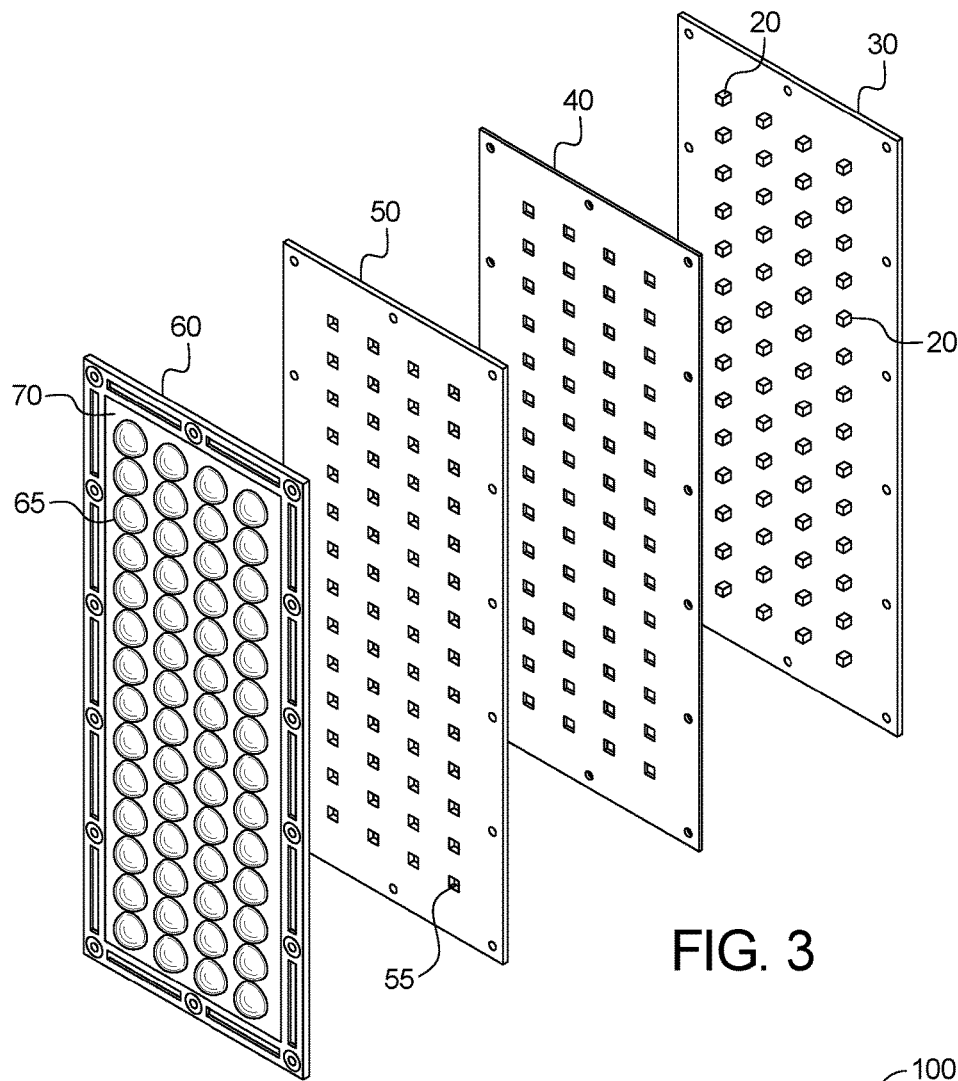
FIG. 3 illustrates an exploded perspective view of the light device of FIG. 1.

FIG. 2 illustrates a cross section of the light device 10. The relative thickness of the elements shown in FIG. 2 is exaggerated for the purposes of illustration. Likewise, FIG. 3 illustrates an exploded perspective view of the light device 10.

In one example, the light device 10 includes a layer of LED lights 20. The LED lights 20 may be an array of diodes mounted on a circuit board 30. A layer of highly reflective film 40, such as Mylar® brand film, may be placed over the circuit board, with the LED lights 20 protruding through the film 40.

Next, layered above the film 40 and sitting at approximately the same level as the LED lights 20 is an edge-light diffusing layer 50. The edge-light diffusing layer 50 may be lie in parallel with the primary direction of emission of edge-light from the LED lights 20 to diffuse the light away from the side of the LED lights 20. In an embodiment, the edge-light diffusing layer 50 is a thin, translucent white plastic made for edge lighting elements. In an embodiment, the edge-light diffusing layer 50 may be formed as a single sheet including a series of precise openings machined for each of the LED diodes to show through. In an embodiment, as described below, the LED lights 20 sit in the cutout spaces of the edge-light diffusing layer 50 and are seated below the surface of it to permit light from the edge of the light cone from each LED light 20 to be diffused by the edge-light diffusing layer 50.

In an embodiment, the edge-light diffusing layer 50 is edge lit plastic including openings 55, with each opening 55 cut-out for an individual light of the LED lights 20. The edge-light diffusing layer 50 may sit at a slightly higher level then the LED lights 20. Light may enter the edge-light diffusing layer 50 at the edge of each opening 55 and also reflects off of the film 40. Although, in an embodiment, the translucent edge-light diffusing layer 50 is translucent, it is not transparent. By providing a semi-opaque layer between the LED lights 20, the edge-light diffusing layer 50 permits edge light entering from the LED lights 20 to illuminate the space between each diode. This illumination effect reduces contrast (one of the main causes of glare). Additionally, this illumination allows the contrast of the light to become more uniform across the whole surface. The result is the intensity from each individual diode of the LED lights 20 is reduced through a light scavenging effect and redirected or "shifted" to the surrounding surface and emitted out of the front of the optic. The edge-light diffusing layer 50 may be manufactured by injection molding or as a two-step over-molding process with the optic.

Above the edge-light diffusing layer 50 and the LED lights 20 may be mounted a conventional lens 60 with molded-in optics 65 for each individual diode. In an embodiment, the light device 10 may include a controllable lens type that is comprised of many, molded optics 65 onto a single lens plate. Each optic of the optics 65 may appear like a bubble on a flat plate that is aligned precisely with its corresponding diode of the LED lights 20. The lens 60 may be made in several different shapes that correlate to a desired light pattern for different uses.

The lens 60, in turn, may be covered with a clear coating 70 with small refractory particles suspended within the coating. The coating 70 may be a UV coating with light dispersion particles 75. By applying a coating 70 containing refractory light dispersion particles 75 to the outer surface of the lens 60, the light device 10 may further break up any remaining direct beams from the LED lights 20 that could cause a flash of glare to be perceived by the eye. In some embodiments, the manufacturing process may utilize 3D printing technology to inject different substrates into the actual optic 65 or elsewhere in the lens 60 to target and break up the glare. For example, in an embodiment, the lens 60 may include light dispersion particles 75.

It is contemplated that in an embodiment, the lens 60, edge-light diffusing layer 50, and the film 40 may be manufactured and sold as a single light device 10 for later inclusion in an LED array. For example, a conventional dual stage injection molding process may be utilized to manufacture the lens 60 along with the edge-light diffusing layer 50 as a single unit. Plastic plating may be used to bond a reflective surface, such as the film 40, directly to the bottom of the lens 60. That lens 60 may then go through a finishing process for the final application of a light refracting particle clear coating 70. An advantage of manufacturing as a one-piece light unit is to simplify the assembly process and reducing that cost factor.

The light device 10 may be used with any standard multi optic array lens 60 including standard "Type" optics depending on the desired beam pattern or spread. For example, in an embodiment, Type II optics are used. This allows the light device 10 to be deployed utilizing most current fixture construction methods and light design software without major fixture redesign. Additionally, the light device 10 may also be used to retrofit any fixture with a standard "Type" multi optic array.

In an embodiment, the film 40 is Mylar® and is applied to the circuit board 30 including LED lights 20 before the addition of the edge-light diffusing layer 50. The film 40 may includes cut-out openings for individual LEDs to pass through to permit the LEDs to "sit higher" than the film 40. The film 40 may be cut with the use of a die or CNC cutter to match any particular circuit board 30. The film 40 may be employed to increase the efficiency of light output by redirecting or reflecting any light loss out of the array. In embodiments where a lower margin of efficiency is acceptable, the film 40 may be omitted. Alternatively the use of reflective plastic plating applied to the back of the optic 65 may achieve the same goals as the film 40.

In various embodiments, the light dispersion coating 70 may be achieved with any type of metallic or pearlescent powder light dispersion particles 75 suspended in a clear topcoat coating 70. Alternatively, as noted, the light dispersion particles 75 may be suspended in the plastic casing of the lens 60 itself. And, in some embodiments, the coating 70 may be replaced with a frosted or etched surface on the lens 60. The purpose of the light dispersion coating 70 is to provide a final layer that is used to shield the LED lights 20 from direct line of sight and break up any final rays of light. By providing a light dispersion coating 70, the light device 10 may have reduced "high angle glare." Because the coating 70 will slightly decrease the optical efficiency of the light device 10, in some embodiments, the light device 10 may omit the coating 70. For example, the coating 70 may be omitted if high angle glare is not an issue due to a narrow beam spread or a lower anti glare effect is acceptable for the application.

Figure 4:
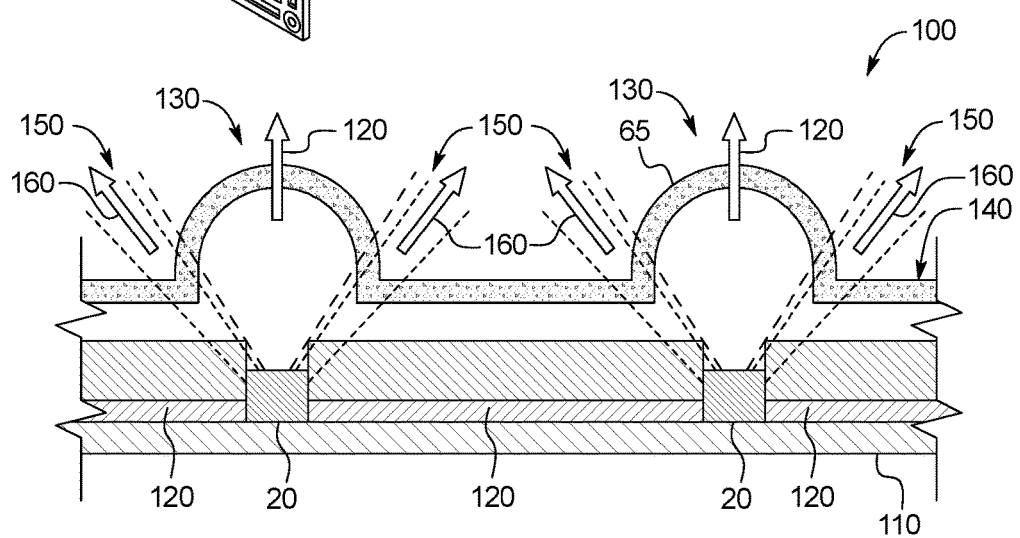
FIG. 4 is a cross-sectional view of another example of a light device.

Turning to FIG. 4, shown is a cross section of a light device 100. As shown in FIG. 4, the light device 100 may include an array of a plurality of LED lights 20 mounted to a housing 110. Generally, LED lights 20 emit a beam spread of light with the highest intensity of the beam directed along a primary axis 120, and lower intensities as the angle from the primary axis 120 is increased. It is contemplated that in an ideal form, a light device 100 would be a plane emitting a uniform amount of light from all points in the plane. However, it is generally not practical to build a light device 100 comprising a single plane of LED lights 20. Accordingly, in an embodiment, the light device 100 may redirect the lower intensity light beams from off the primary axis 120 of each LED light 120 into the space between the LED lights 20 to create a more uniform plane of light. As described below, the light device 100 of FIG. 4 utilizes a thicker diffusing layer 170 to increase the spread of the light from the LED lights 20.

When active, each of the plurality lights emits a high intensity light beam 130 along a primary axis 120. In FIG. 4, the boundaries of the high intensity light beam 130 are shown. The primary axis 120 passes through the lens 60 that is mounted to the housing 110. Much of the high intensity light beam 130 may pass through an optic element 65. The lens 60 and the optic element 65 may include a diffusive surface 140 to further break up the high intensity light beam 130 as it passes through. As described above, the diffusive surface 140 may include a coating 70 with light dispersion particles 75, or may include a frosted or etched diffusive surface 140.

While the high intensity light beam 130 may pass unaltered into the lens 60, a lower intensity beam 150 along a secondary axis 160 may be intercepted by the diffusing layer 170. The lower intensity beam 150 is emitted at high angles relative to the primary axis 120. FIG. 4 illustrates boundaries of the unobstructed path of the lower intensity beam 150. The diffusing layer 170 may extend above the light emitting-surface of the LED lights along the direction of the primary axis 120 to divert the lower intensity beam 150 from a shown unobstructed path and diffuse it in the diffusing layer 170. As shown, the diffusing layer 170 does not intersect the primary axis, but does intersect the secondary axis 160 to capture the lower intensity beam 150. The light from the lower intensity beam 150 may be diffused by the translucent nature of the diffusing layer 170 which may cause the light to travel along the diffusing layer 170, to reflect off of a reflective film 40, or to pass into the lens 60 for emission. By diffusing the light, the light device 100 spreads the light creating a more uniform emission of light from the light device 100.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A device for providing light comprising:
   an array of a plurality of LED lights, wherein, when active, each of the plurality of LED lights emits a highest intensity beam of light along a primary axis and emits a lower intensity beam of light along a secondary axis; and
   a translucent edge-light diffusing layer located between two or more of the plurality of LED lights, the edge-light diffusing layer is not intersected by the primary axis and is intersected by the secondary axis of the two or more of the plurality of LED lights.

2. The device for providing light of claim 1, further comprising a lens mounted to a housing, the lens including an optic element corresponding to each of the plurality of LED lights, each optic element intersected by the primary axis of a corresponding LED light of the plurality of LED lights.

3. The device for providing light of claim 2, wherein each optic element includes a diffusive surface.

4. The device for providing light of claim 3, wherein each diffusive surface includes a coating including suspended diffusive particles.

5. The device for providing light of claim 1, wherein the edge-light diffusing layer is translucent plastic.

6. The device for providing light of claim 1, wherein the device further includes a reflective layer between the housing and the edge-light diffusing layer.

7. The device for providing light of claim 1, wherein the primary axis of each LED light of the plurality of LED lights is parallel to the others.

8. The device for providing light of claim 1, wherein a thickness of the edge-light diffusing layer equals a thickness of the plurality of LED lights.

9. The device for providing light of claim 1, wherein the edge-light diffusing layer extends above the light emitting-surface of the LED lights along the direction of the primary axis.

10. A device for providing light comprising:
   a plurality of LED lights, wherein, when active, each of the plurality of LED lights emits a higher intensity beam of light along a primary axis and emits a lower intensity beam of light along a secondary axis; and
   a translucent edge-light diffusing layer located between two or more of the plurality of LED lights, the edge-light diffusing layer is not intersected by the primary axis and is intersected by the secondary axis of the two or more of the plurality of LED lights.

11. The device for providing light of claim 10, wherein each of the plurality of LED lights emits a highest intensity beam of light along the primary axis.

12. The device for providing light of claim 10, further comprising a lens mounted to a housing, the lens including an optic element corresponding to each of the plurality of LED lights, each optic element intersected by the primary axis of a corresponding LED light of the plurality of LED lights.

13. The device for providing light of claim 12, wherein each optic element includes a diffusive surface.

14. The device for providing light of claim 13, wherein each diffusive surface includes a coating including suspended diffusive particles.

15. The device for providing light of claim 10, wherein the edge-light diffusing layer is translucent plastic.

16. The device for providing light of claim 10, wherein the device further includes a reflective layer between the housing and the edge-light diffusing layer.

17. The device for providing light of claim 10, wherein the primary axis of each LED light of the plurality of LED lights is parallel to the others.

18. The device for providing light of claim 10, wherein a thickness of the edge-light diffusing layer equals a thickness of the plurality of LED lights.

19. The device for providing light of claim 10, wherein the edge-light diffusing layer extends above the light emitting-surface of the LED lights along the direction of the primary axis.

* * * * *